United States Patent [19]

Dowling

[11] Patent Number: 5,553,167
[45] Date of Patent: Sep. 3, 1996

[54] METHOD AND APPARATUS FOR THRESHOLDING IMAGES IN PIPELINE FASHION UTILIZING AGING FUNCTIONS

[75] Inventor: John H. Dowling, Brookfield, Conn.

[73] Assignee: United Parcel Service of America, Inc., Atlanta, Ga.

[21] Appl. No.: 237,323

[22] Filed: May 3, 1994

Related U.S. Application Data

[63] Continuation of Ser. No. 9,881, Jan. 27, 1993, abandoned.

[51] Int. Cl.$^6$ ........................................... G06K 9/38
[52] U.S. Cl. ..................... 382/270; 382/303; 358/466
[58] Field of Search ..................... 382/270, 273, 382/271, 272, 303; 358/465, 466; 235/462

[56] References Cited

U.S. PATENT DOCUMENTS

| | | | |
|---|---|---|---|
| 4,205,780 | 6/1980 | Burns et al. | 235/454 |
| 4,442,544 | 4/1984 | Moreland et al. | 235/463 |
| 4,468,704 | 8/1984 | Stoffel et al. | 382/52 |
| 4,491,964 | 1/1985 | Sanner | 382/50 |
| 4,501,016 | 2/1985 | Persoon et al. | 382/22 |
| 4,593,325 | 6/1986 | Kannapell et al. | 358/466 |
| 4,601,055 | 7/1986 | Kent | 382/303 |
| 4,798,943 | 1/1989 | Cherry | 382/273 |
| 4,801,788 | 1/1989 | Osaka | 382/270 |
| 4,853,792 | 8/1989 | Katsuta et al. | 358/455 |
| 4,941,192 | 7/1990 | Mishima et al. | 382/54 |
| 4,980,544 | 12/1990 | Winter | 235/494 |
| 5,073,954 | 12/1991 | Van Tyne et al. | 382/18 |
| 5,077,812 | 12/1991 | Kanno et al. | 382/50 |
| 5,120,940 | 6/1992 | Willsie | 235/462 |
| 5,121,447 | 6/1992 | Tanioka et al. | 382/50 |
| 5,313,533 | 5/1994 | Scott | 382/273 |

OTHER PUBLICATIONS

Digital Image Processing, by Rafael C. Gonzalez and Paul Wintz, Chapter 7, "Image Segmentation," Addison–Wesley Publishing Company (1987), pp. 331–390.

*Primary Examiner*—Michael T. Razavi
*Assistant Examiner*—Jon Chang
*Attorney, Agent, or Firm*—Steve Mendelsohn; William H. Murray

[57] ABSTRACT

An adaptive thresholding filter generates multiple threshold values for use in thresholding the multi-bit pixels of a gray-scale input image. Each threshold value is based on a current white reference value and a current black reference value. The current white reference value is selected based on a comparison of the current image pixel to a white reference comparator value generated by applying a white reference aging function to a prior white reference value. The current black reference value is selected analogously using a black reference comparator value and a black reference aging function.

28 Claims, 12 Drawing Sheets

METHOD AND APPARATUS FOR THRESHOLDING IMAGES IN PIPELINE FASHION UTILIZING AGING FUNCTIONS

This is a continuation of application Ser. No. 08/009,881, filed on Jan. 27, 1993, now abandoned.

BACKGROUND OF THE INVENTION

1. Field of the Invention

The present invention relates to image processing, and, in particular, to a method and apparatus for adaptive thresholding of multi-bit pixel images.

2. Statement of Related Art

Image processing often involves the thresholding of multi-bit (i.e., gray-scale) input pixel images into one-bit (i.e., binary) output pixel images. In certain applications, the thresholding decision for each pixel in the input image may be based on a single constant threshold value. However, using a fixed threshold value will not yield adequate results in all applications.

Referring to FIG. 1, there is shown a graphical representation of one row of an 8-bit pixel image for which a fixed threshold value will not yield adequate results. FIG. 1 may represent a line perpendicularly bisecting a barcode symbol having dark bars and bright spaces. The image of FIG. 1 may have been generated in an environment in which the illumination was not uniform over the imaged area. Alternatively, the image may have been generated using a camera with non-uniform response over the camera sensing elements.

As a result, the image of FIG. 1 exhibits variations in both offset and dynamic range across the image. The variation in offset is so great that pixels corresponding to "bright" symbol spaces at the edge of the image have values less than pixels corresponding to "dark" symbol bars at the center of the image. Using a fixed threshold therefore will not accurately distinguish all bars and spaces in the image.

To solve this problem, methods and systems for thresholding have been developed that employ adaptive thresholding. In adaptive thresholding, the threshold value varies over the image according to functions based on the actual image pixels. However, conventional adaptive thresholding does not adequately threshold images in all applications. For example, conventional adaptive thresholding is unable to threshold, in real time and in a cost-efficient manner, gray-scale images generated by high-speed, monochrome, line-scan video cameras.

SUMMARY OF THE INVENTION

In a preferred embodiment, the present invention is a method and apparatus for generating a thresholded image from an input image having a plurality of multi-bit pixels. A first threshold value is determined in accordance with one or more aging functions and a first pixel of the input image is thresholded according to the first threshold value to generate a first thresholded pixel. In addition, a second threshold value is determined in accordance with the one or more aging functions and a second pixel of the input image is thresholded according to the second threshold value to generate a second thresholded pixel. The thresholded image is generated in accordance with the first and second thresholded pixels.

In an alternative preferred embodiment, the present invention is an apparatus for generating a thresholded image from an input image having a plurality of multi-bit input pixels. The apparatus determines one or more white reference values and one or more black reference values in accordance with the input pixels. The apparatus applies a white reference aging function to the white reference values and a black reference aging function to the black reference values. In addition, the apparatus determines one or more threshold values in accordance with the white and black reference values and thresholds the input pixels in accordance with the threshold values to generate thresholded pixels. The apparatus generates the thresholded image in accordance with the thresholded pixels.

In another alternative preferred embodiment, the present invention is a method for generating a thresholded image from an input image having a plurality of multi-bit pixels. A first pixel and a second pixel of the plurality of pixels are received. A white reference value and a black reference value are determined in accordance with the second pixel. A white reference aging function is applied to the white reference value to generate a white reference comparator value. Similarly, a black reference aging function is applied to the black reference value to generate a black reference comparator value. A threshold value is calculated in accordance with the white and black reference values and the first pixel is thresholded in accordance with the threshold value to generate a first thresholded pixel. The thresholded image is generated in accordance with the first thresholded pixel.

DETAILED DESCRIPTION OF THE INVENTION

Figure 2:
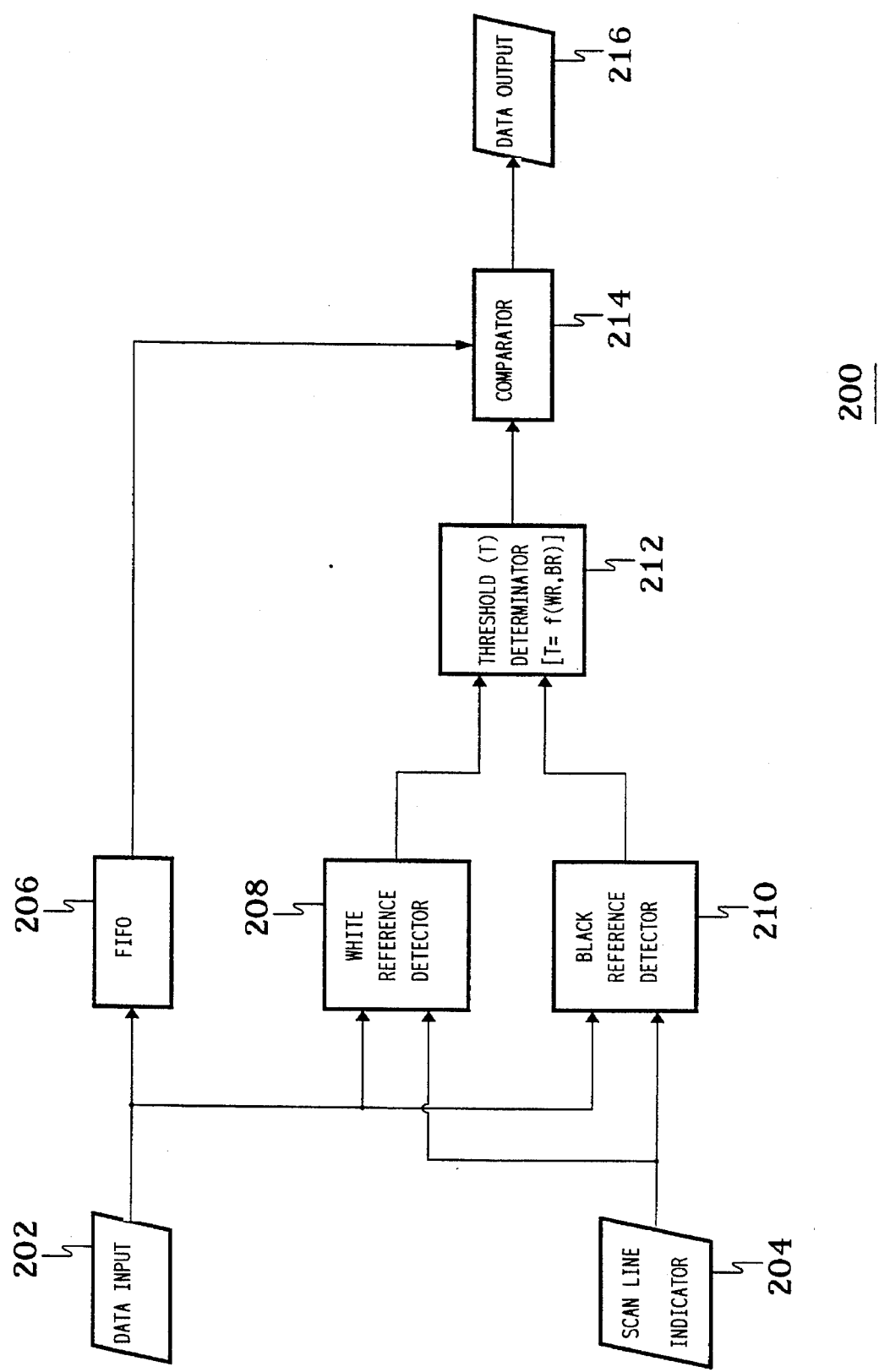
FIG. 2 is a functional block diagram of an adaptive threshold filter according to a preferred embodiment of the present invention.

Referring now to FIG. 2, there is shown a functional block diagram of adaptive threshold filter 200 according to a preferred embodiment of the present invention. Filter 200 accepts as input an image formed of eight-bit pixels and generates a thresholded image formed of binary pixels as output. In a preferred embodiment, filter 200 thresholds, in real time, a gray-scale input image as each row of that input image is generated by a line-scan video camera.

For each pixel in the input image, filter 200 applies a threshold value to determine whether the corresponding pixel in the output image is to be a "1" for white or a "0" for black. Filter 200 selects the threshold value to apply to a each input pixel. The threshold value is based on white and black reference values. The white and black reference values are determined by applying white and black reference aging functions to the intensity values of the input pixels. The white and black reference values vary over the image. As a result, different threshold values are applied to different pixels during the filtering of an input image.

Filter 200 receives eight-bit input image data at data input 202, one pixel at a time and one image row at a time. Each input pixel is transmitted to FIFO (first-in, first-out storage device) 206, white reference detector 208, and black reference detector 210. FIFO 206 is a storage device with a specified capacity. For example, a five-pixel FIFO stores the five most recent pixels. When a new pixel is received by FIFO 206 the oldest pixel in FIFO 206 is transmitted to comparator 214. Scan line indicator 204 indicates when the first and last pixels of each row of the input image are received at data input 202.

White reference detector 208 receives the intensity value for the current pixel. Detector 208 uses that pixel value to determine two values—a white reference value (WR) and a white reference comparator value (WRCV). The white reference value (WR) is transmitted to threshold determinator 212, where WR is used to determine the threshold value (T) used by comparator 214 to threshold the pixel transmitted by FIFO 206 to comparator 214. Detector 208 compares the current pixel value to the white reference comparator value (WRCV) to determine whether to select a new white reference value (WR). Detector 208 also applies a white reference aging function to update the white reference comparator value (WRCV). The white reference aging function is a parameter-driven function that "ages" the WRCV. The processing of detector 208 is described in further detail later in this specification in conjunction with FIG. 3. The white reference aging function is described in further detail later in this specification in conjunction with FIG. 4.

Similarly, black reference detector 210 receives the current pixel value and uses that pixel value to determine two values—a black reference value (BR) and a black reference comparator value (BRCV). The black reference value (BR) is transmitted to threshold determinator 212 and used along with the white reference value (WR) to determine the threshold value (T) used by comparator 214. Detector 210 compares the current pixel value to the black reference comparator value (BRCV) to determine whether to select a new black reference value (BR). Detector 210 also applies a black reference aging function to update the black reference comparator value (BRCV). The black reference aging function is analogous to the white reference aging function and "ages" the BRCV. The processing of detector 210 and the black reference aging function are described in further detail later in this specification in conjunction with FIG. 5.

Threshold determinator 212 receives the white reference value (WR) from detector 208 and the black reference value (BR) from detector 210 and uses those values to determine the current threshold value (T). The processing of determinator 212 is described in further detail later in this specification in conjunction with FIG. 6. Determinator 212 transmits the threshold value to comparator 214 which also receives an input pixel from FIFO 206. Comparator 214 applies the threshold value to the input pixel to determine the corresponding binary pixel in the output image. If the input pixel is less than the threshold value, then the output pixel is set to "0" or black. Otherwise, the output pixel is set to "1" or white. The output pixel is transmitted to data output 216 which transmits the output data for subsequent image processing.

White Reference Detector Processing

Figure 3:
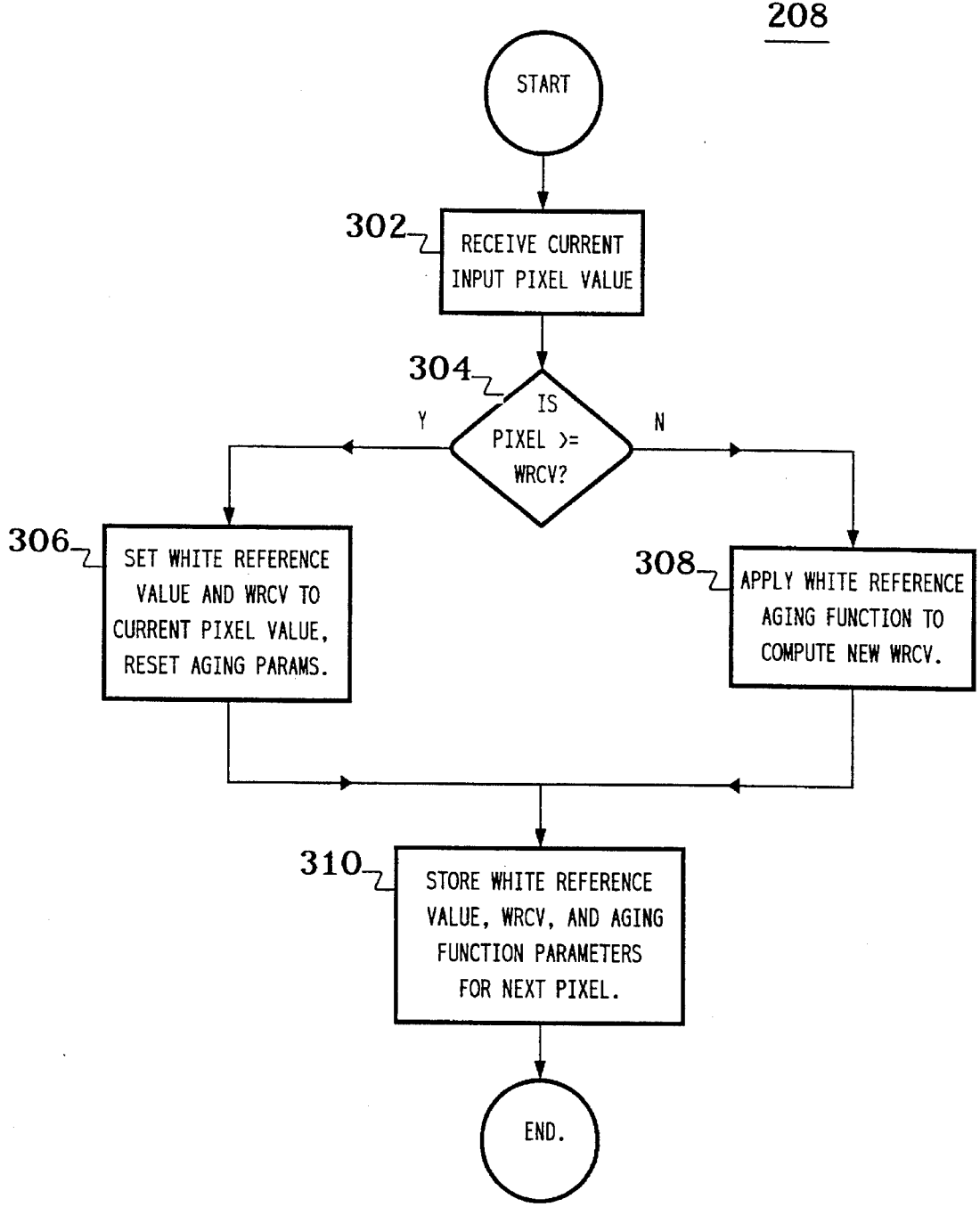
FIG. 3 is a block flow diagram of the processing performed by the white reference detector of the filter of FIG. 2.

Referring now to FIG. 3, there is shown a block flow diagram of the processing performed by white reference detector 208 of filter 200. Detector 208 determines the white reference value (WR) based on the current input pixel. Detector 208 either retains the white reference value (WR) that was used for the previous input pixel or sets the white reference value (WR) to be equal to the current input pixel value.

White reference detector 208 receives the current input pixel at means 302. Means 304 determines whether the current input pixel value is greater than or equal to a white reference comparator value (WRCV). If so, then means 306 (i) sets both the white reference value (WR) and the WRCV to be equal to the current input pixel value and (ii) resets the parameters that control the white reference aging function. Otherwise, means 308 applies the white reference aging function to compute a new value for the WRCV. In either case, processing then continues to means 310, which stores the white reference value (WR), the WRCV, and the white reference aging function parameters for the next input pixel.

In addition to the processing shown in FIG. 3, white reference detector 208 performs special processing when scan line indicator 204 transmits a signal that the current pixel is the last pixel in a row of the input image ("the last-pixel-in-a-row signal"). That signal instructs white reference detector 208 to output the white reference value (WR) selected for the current pixel for the next n cycles, where n is the size of FIFO 206.

The last-pixel-in-a-row signal from scan line indicator 204 also informs white reference detector 208 that the next value received will correspond to the first pixel of the next row of the input image. White reference detector 208 initializes the white reference comparator valve (WRCV) to 0 prior to processing the first pixel in an image row. This ensures that both the white reference value (WR) and the WRCV will be set equal to the first pixel at the start of a new row.

White Reference Aging Function

For every processing cycle of filter 200, another input pixel is processed and detector 208 determines whether to reset the white reference value (WR) to the value of the current input pixel. If the WR is not reset, then detector 208 "ages" (i.e., decrements) the white reference comparator value (WRCV) according to the white reference aging function. The white reference aging function controls the degree to which the WRCV is aged during the current cycle. If the WR is reset to the value of the current input pixel, then the WRCV is also reset to the value of the current input pixel and the parameters that control the white reference aging function are initialized.

In a preferred embodiment, the white reference aging function implemented by means 308 of white reference detector 208 is defined by a pre-defined sequence of contiguous linear segments. The aging function maps in two-dimensional space the relationship between the number of pixels processed by means 308 since the WRCV was last reset (X axis) versus an aging (or decrementing) parameter (Y axis). The slopes of the linear segments forming the aging function control the degree to which the white reference comparator value (WRCV) is decremented during the current cycle. Each segment i of the aging function is defined by three parameters $X_i$, $Y_i$, $L_i$. $X_i$ and $Y_i$ determine the slope of the segment and $X_i$ and $L_i$ determine the length of the segment. For every $X_i$ input pixels, the WRCV is decremented by $Y_i$. This degree of decrementing continues for ($X_i \times L_i$) pixels along the aging function.

Figure 4:
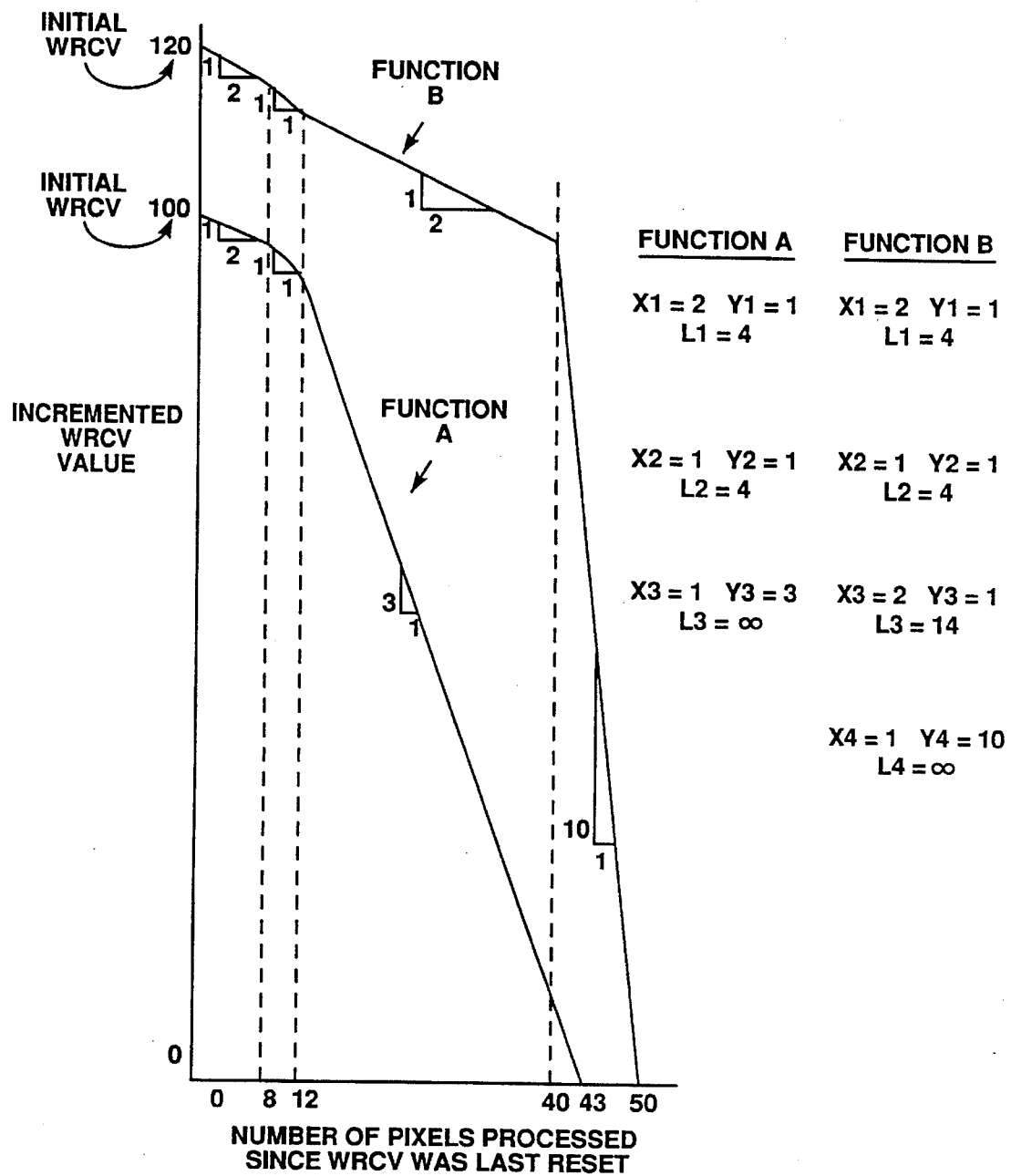
FIG. 4 is a graphical representation of two different white reference aging functions that may be implemented by the white reference detector of FIG. 3.

Referring now to FIG. 4, there is shown a graphical representation of two exemplary white reference aging functions—functions A and B—that may be implemented by means 308 of white reference detector 208. Function A has three linear segments defined by three sets of $X_i$, $Y_i$, $L_i$. The y-intercept of the first segment is the initial WRCV value that was assigned when the WRCV was last reset by means 306. The first segment of function A subtracts the value $Y_1=1$ from the WRCV for every $X_1=2$ pixels until $(X_1 \times L_1)=8$ pixels have been processed. For the next $(X_2 \times L_2)=4$ pixels, the second segment subtracts the value $Y_2=1$ from the WRCV every $X_2=1$ pixel. For all subsequent pixels, the third segment subtracts the value $Y_3=3$ from the WRCV every $X_3=1$ pixel until the WRCV is decremented to a 0 value.

FIG. 4 presents the results of applying white reference aging function A to an initial white reference comparator value (WRCV) of 100. For the first $(X_1 \times L_1)=8$ pixels that follow the pixel for which the WRCV was last reset, white reference detector 208 decrements the WRCV by $Y_1=1$ every $X_1=2$ pixels. Thus, after a second pixel is processed by means 308, WRCV=99, and after a fourth pixel, WRCV=98, and so on. Since the magnitude of the slope of the first segment is one-half, the WRCV is preferably not decremented after the first, third, fifth, and seventh pixels are processed. After an eighth pixel is processed, WRCV=96.

For the $(X_2 \times L_2)=4$ pixels that follow the eighth pixel, white reference detector 208 uses the second segment of function A to decrement the WRCV by $Y_2=1$ every $X_2=1$ pixel. Thus, after a twelfth pixel is processed, WRCV=92. For the rest of the pixels that follow the twelfth pixel, white reference detector 208 uses the third segment of function A to decrement the WRCV by $Y_1=3$ every $X_1=1$ pixel until WRCV=0, corresponding to the minimum pixel intensity value.

FIG. 4 also presents the results of applying white reference aging function B, which has four linear segments, to an initial pixel of 120. Those skilled in the art will understand that the white reference aging function implemented by white reference detector 208 may be defined by any number of linear segments of any slope and length. As such, the white reference aging function can be used to achieve characteristic shapes that may be extremely difficult and/or expensive to achieve using analog RC circuitry.

Black Reference Detector processing

Figure 5:
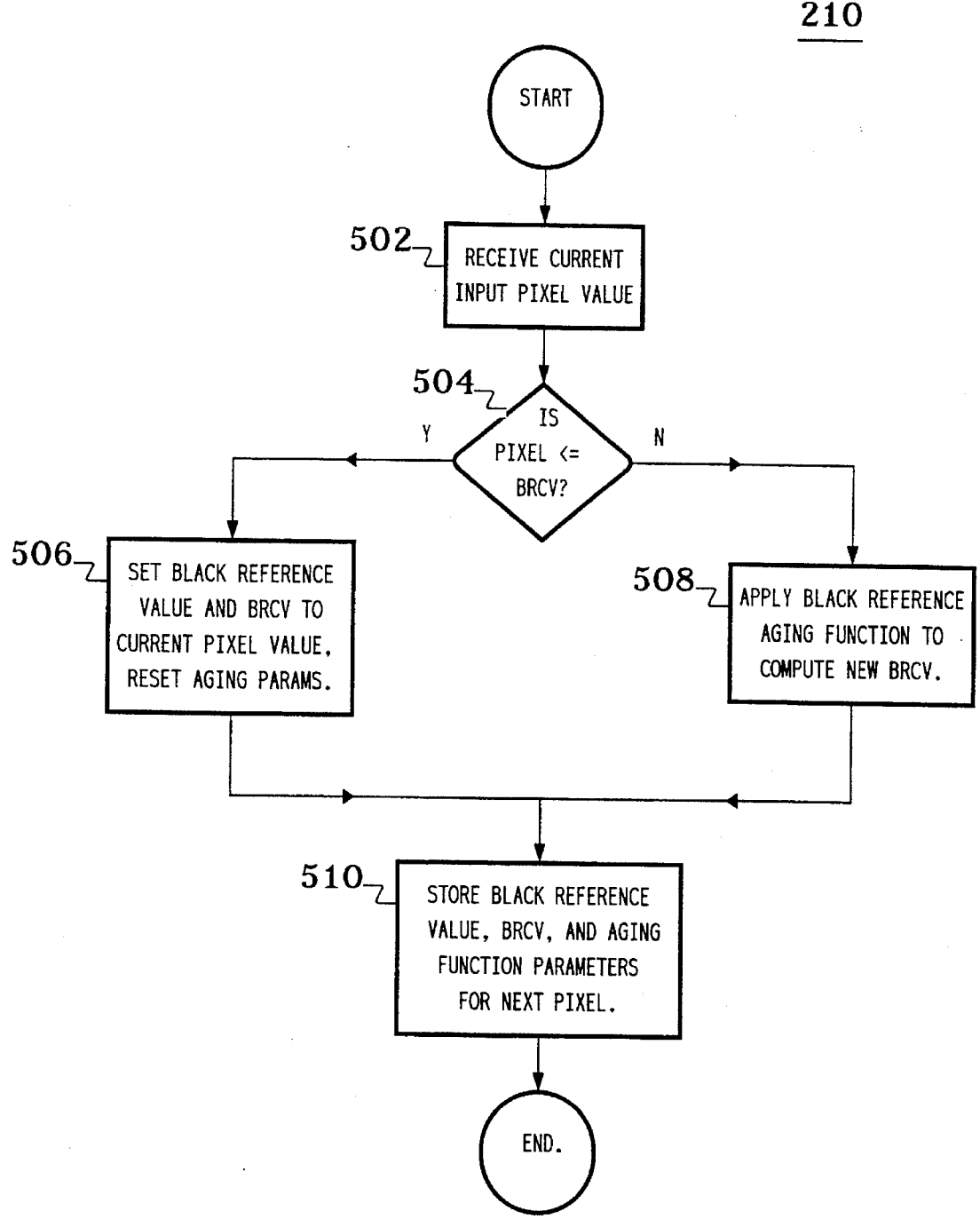
FIG. 5 is a block flow diagram of the processing performed by the black reference detector of the filter of FIG. 2.

Referring now to FIG. 5, there is shown a block flow diagram of the processing performed by black reference detector 210 of filter 200. With the exception of several differences discussed below, means 502, 504, 506, 508, and 510 operate substantially in accordance with means 302, 304, 306, 308, and 310 of white reference detector 208, respectively. White reference detector 208 is described earlier in this specification in conjunction with FIG. 3.

Detector 210 generates a black reference value (BR) and a black reference comparator value (BRCV) for each input pixel. Means 504 of black reference detector 210 determines whether the current pixel value is less than or equal to the BRCV. Black reference detector 210 resets the black reference comparator value (BRCV) to 255 (for eight-bit pixel images) at the start of each new row of the input image to ensure that the black reference value (BR) is reset when the first pixel in the new row is processed.

Where means 308 of detector 208 decrements the WRCV by $Y_i$ during the current cycle, means 508 of detector 210 increments the BRCV by $Y_i$ during the current cycle. For example, a black reference aging function may have two segments, where the first segment is defined by $X_1=1$, $Y_1=2$, and $L_1=8$. For the first $(X_1 \times L_1)=8$ pixels after the black reference value (BR) is reset, detector 210 increments the black reference comparator value (BRCV) by $Y_1=2$ every $X_1=1$ pixel.

Thus, if the BRCV has an initial value of 50, then BRCV=52 after the first pixel is processed, and BRCV=54 after the second pixel is processed. After the eighth pixel is processed, BRCV=66 and detector 210 switches to the second segment of the black reference aging function to determine the black reference aging increment for the next cycle. In general, the black reference aging function parameters need not be the same as those for the white reference aging function.

Threshold Determinator Processing

Figure 6:
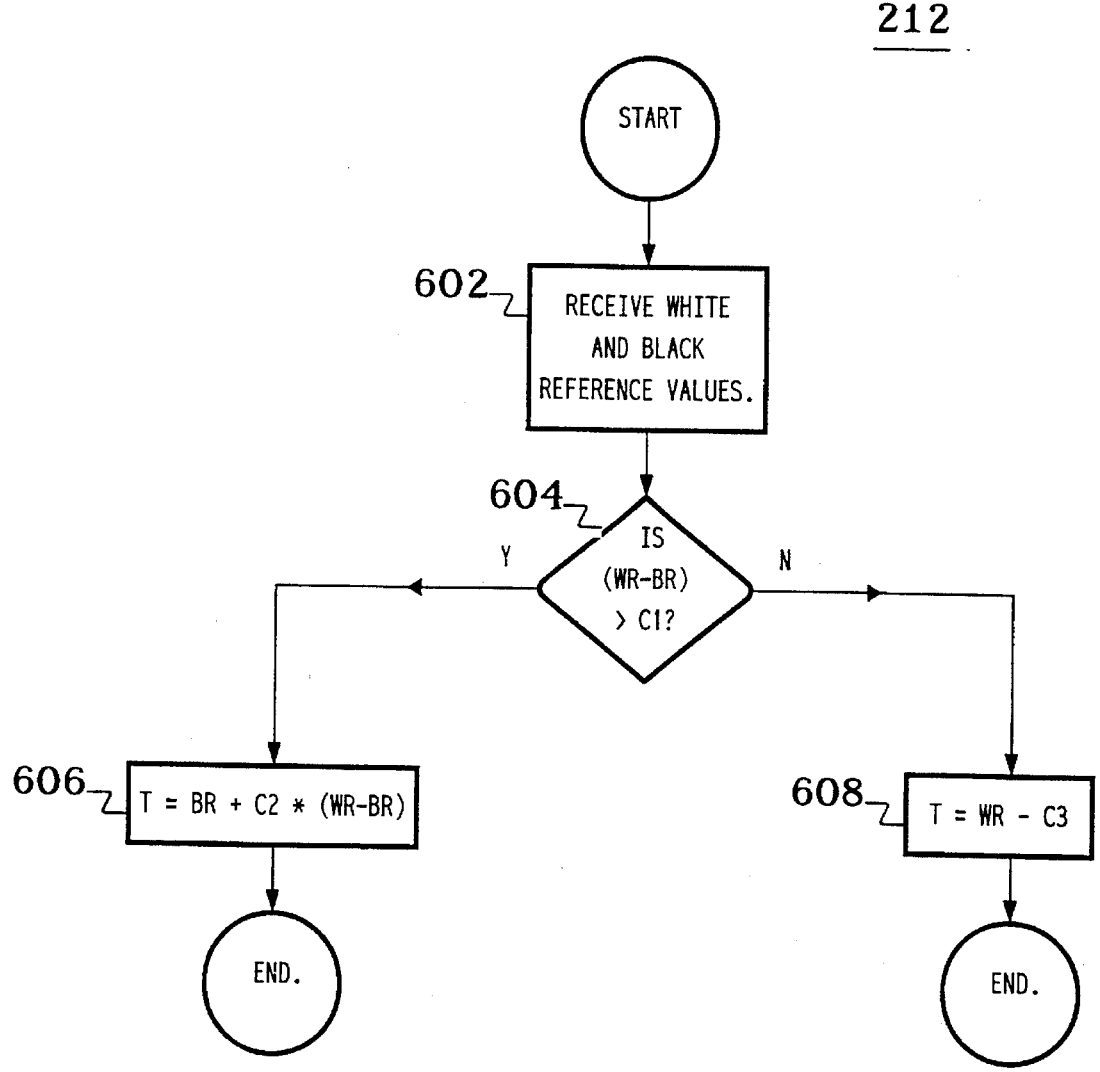
FIG. 6 is a block flow diagram of the processing performed by the threshold determinator of the filter of FIG. 2.

Referring now to FIG. 6, there is shown a block flow diagram of the processing performed by threshold determinator 212 of filter 200. Determinator 212 calculates the current threshold value (T) based on the white reference value (WR) and the black reference value (BR) as selected by detectors 208 and 210, respectively. Determinator 212 uses a different function to calculate the threshold value depending upon the difference between the white and black reference values.

After white reference detector 208 and black reference detector 210 determine the white and black reference values, respectively, these values are transmitted to means 602 of threshold determinator 212. Means 604 determines whether the difference between the white reference value WR and the black reference value BR is greater than a specified dynamic-range threshold C1. The dynamic-range threshold C1 is used to distinguish between regions in the pixel image having sufficiently large dynamic range and those with insufficient dynamic range. The value of C1 will depend upon the characteristics of the images to be processed by filter 200.

If the difference between the white and black reference values (WR–BR) is greater than the dynamic-range threshold C1, then the local dynamic range is sufficiently large and means 606 determines the threshold T for the current pixel according to Equation (1) below:

$$T=BR+C2*(WR-BR), \qquad (1)$$

where C2 is a specified constant. When C2 is set to 0.5, the threshold T is equal to the average of the white reference WR and black reference BR values.

If the difference between the white and black reference values (WR–BR) is not greater than the dynamic-range threshold C1, then the local dynamic range is relatively small and means 608 determines the threshold T for the current pixel according to Equation (2) below:

$$T = WR - C3, \quad (2)$$

where C3 is a specified constant. Constant C3 is preferably selected to be half the value of the dynamic-range threshold C1, to bias filter 200 towards selecting white for those pixels within regions of the input image having little dynamic range. Those skilled in the art will understand that such a strategy is applicable to thresholding images of barcode symbols in which patterns of white spaces and black bars exist on a white background. It will also be understood that, to bias towards selecting black, the threshold T may be alternatively determined by adding a constant C3 to the black reference value BR. In other applications, C1, C2, and C3 may assume other values and may also be functions rather than constants.

Referring now to FIGS. 7, 8, 9, and 10, there are shown graphical representations of the processing of filter 200 for an exemplary input image. The data plotted in FIGS. 7, 8, 9, and 10 are tabulated in Table I. The exemplary image has forty pixels per row, where minimum and maximum pixel intensity values are 0 and 40, respectively. In the example, the size of FIFO 206 is five pixels and both the white and black reference aging functions have only one segment defined by the same parameters X1=1, Y1=2, and L1=20. Lastly, the threshold determinator parameters applied in the example are C1=10, C2=0.5, and C3=5.

TABLE I

| Input Pixel | Input Value | White Ref | Black Ref | WRCV | BRCV | Thresh | B/W | Output Pixel |
| --- | --- | --- | --- | --- | --- | --- | --- | --- |
| 1 | 10 | 10 | 10 | 10 | 10 | 5 | — | — |
| 2 | 13 | 13 | 10 | 13 | 12 | 8 | — | — |
| 3 | 11 | 13 | 11 | 11 | 11 | 8 | — | — |
| 4 | 25 | 25 | 11 | 25 | 13 | 18 | — | — |
| 5 | 30 | 30 | 11 | 30 | 15 | 20 | — | — |
| 6 | 28 | 30 | 11 | 28 | 17 | 20 | B | 1 |
| 7 | 29 | 29 | 11 | 29 | 19 | 20 | B | 2 |
| 8 | 32 | 32 | 11 | 32 | 21 | 21 | B | 3 |
| 9 | 28 | 32 | 11 | 30 | 23 | 21 | W | 4 |
| 10 | 31 | 31 | 11 | 31 | 25 | 21 | W | 5 |
| 11 | 30 | 31 | 11 | 29 | 27 | 21 | W | 6 |
| 12 | 28 | 31 | 11 | 27 | 29 | 21 | W | 7 |
| 13 | 32 | 32 | 11 | 32 | 31 | 21 | W | 8 |
| 14 | 24 | 32 | 24 | 30 | 24 | 27 | W * | 9 |
| 15 | 31 | 31 | 24 | 31 | 26 | 26 | W * | 10 |
| 16 | 14 | 31 | 14 | 29 | 14 | 22 | W | 11 |
| 17 | 10 | 31 | 10 | 27 | 10 | 20 | W | 12 |
| 18 | 13 | 31 | 10 | 25 | 12 | 20 | W | 13 |
| 19 | 16 | 31 | 10 | 23 | 14 | 20 | W | 14 |
| 20 | 19 | 31 | 10 | 21 | 16 | 20 | W | 15 |
| 21 | 21 | 21 | 10 | 21 | 18 | 15 | B | 16 |
| 22 | 22 | 22 | 10 | 22 | 20 | 16 | B | 17 |
| 23 | 20 | 22 | 20 | 20 | 20 | 17 | B * | 18 |
| 24 | 18 | 22 | 18 | 18 | 18 | 17 | B * | 19 |
| 25 | 19 | 19 | 18 | 19 | 20 | 14 | W * | 20 |
| 26 | 6 | 19 | 6 | 17 | 6 | 12 | W | 21 |
| 27 | 4 | 19 | 4 | 15 | 4 | 11 | W | 22 |
| 28 | 7 | 19 | 4 | 13 | 6 | 11 | W | 23 |
| 29 | 3 | 19 | 3 | 11 | 3 | 11 | W | 24 |
| 30 | 17 | 17 | 3 | 17 | 5 | 10 | W | 25 |
| 31 | 15 | 17 | 3 | 15 | 7 | 10 | B | 26 |
| 32 | 20 | 20 | 3 | 20 | 9 | 11 | B | 27 |
| 33 | 17 | 20 | 3 | 18 | 11 | 11 | B | 28 |
| 34 | 8 | 20 | 8 | 16 | 8 | 14 | B | 29 |
| 35 | 5 | 20 | 5 | 14 | 5 | 12 | W | 30 |
| 36 | 4 | 20 | 4 | 12 | 4 | 12 | W | 31 |
| 37 | 3 | 20 | 3 | 10 | 3 | 11 | W | 32 |
| 38 | 15 | 15 | 3 | 15 | 5 | 9 | W | 33 |
| 39 | 17 | 17 | 3 | 17 | 7 | 10 | B | 34 |
| 40 | 16 | 17 | 3 | 15 | 9 | 10 | B | 35 |
| 40 | 16 | 16 | 3 | 16 | 11 | 9 | B | 36 |
| 40 | 16 | 16 | 3 | 16 | 13 | 9 | B | 37 |
| 40 | 16 | 16 | 3 | 16 | 15 | 9 | W | 38 |
| 40 | 16 | 16 | 3 | 16 | 17 | 9 | W | 39 |
| 40 | 16 | 16 | 16 | 16 | 16 | 11 | W * | 40 |

Figure 7:
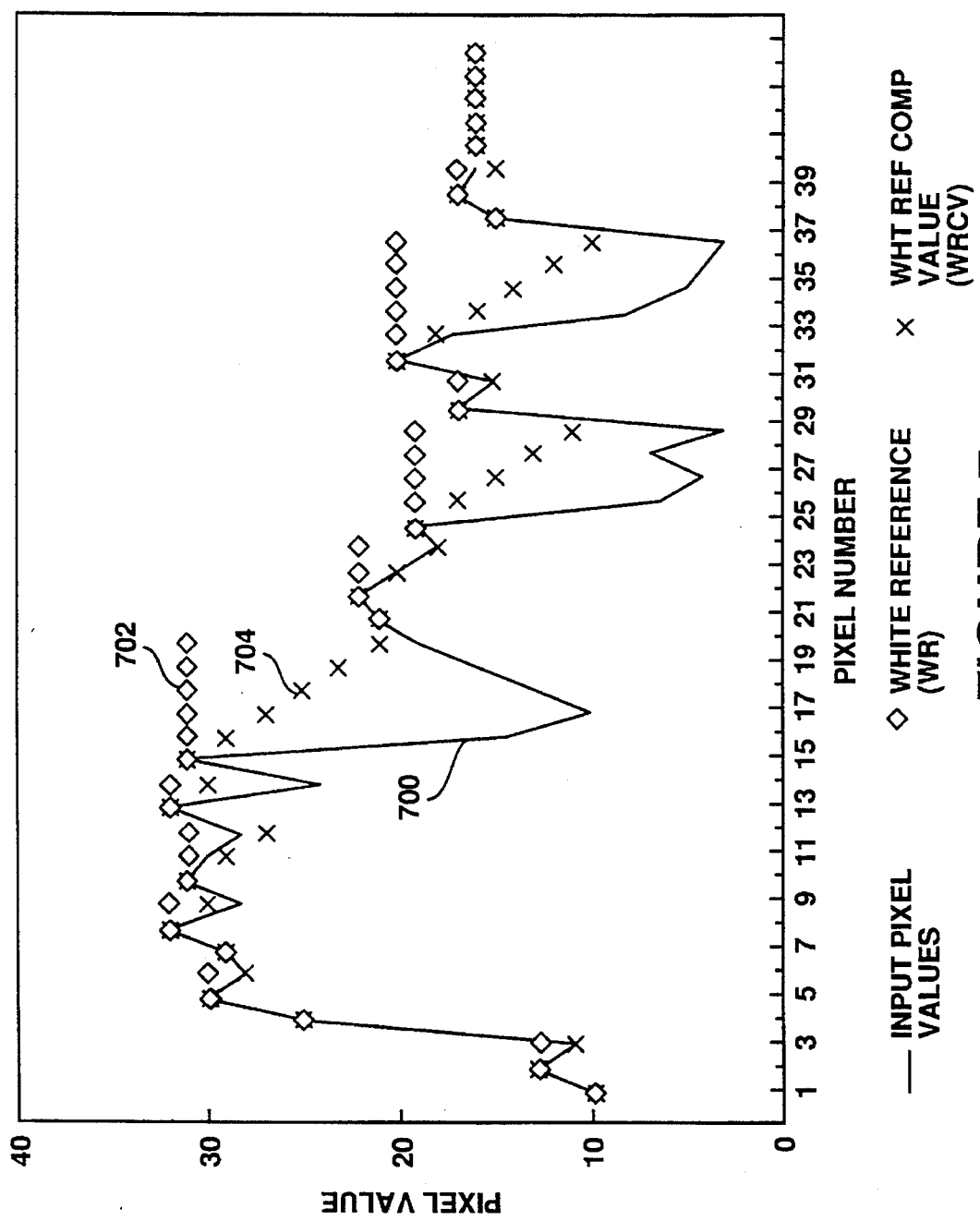
FIGS. 7, 8, 9, and 10 are graphical representations of the processing of the filter of FIG. 2 for a particular scenario.
Figure 8:
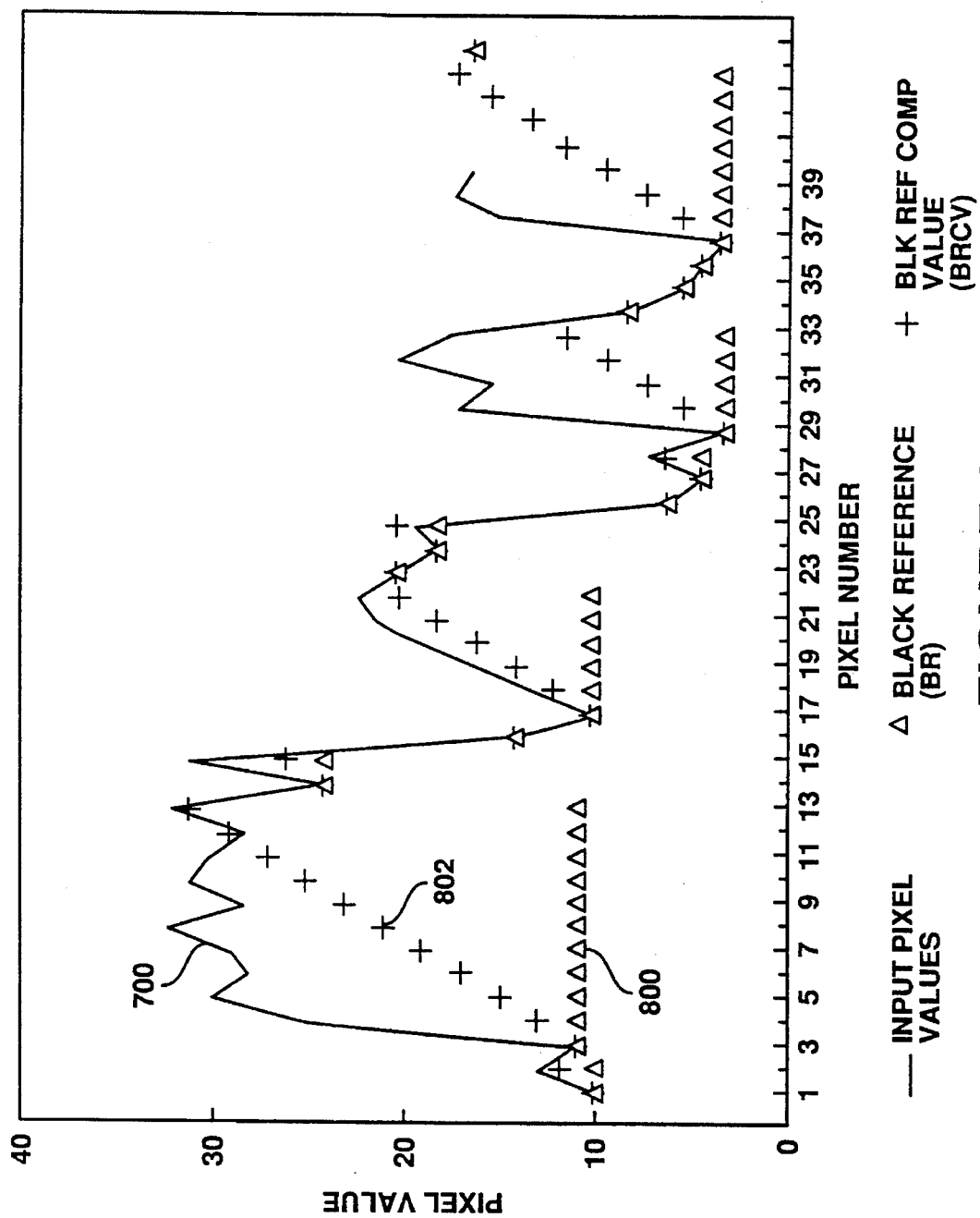

FIG. 7 presents a plot of the input pixels 700 for the exemplary input image. FIG. 7 also presents plots of the white reference values 702 and the white reference comparator values 704 generated by white reference detector 208 from those input pixels. Similarly, FIG. 8 presents plots of the input pixels 700, the black reference values 800, and the black reference comparator values 802 generated by black reference detector 210.

Figure 9:
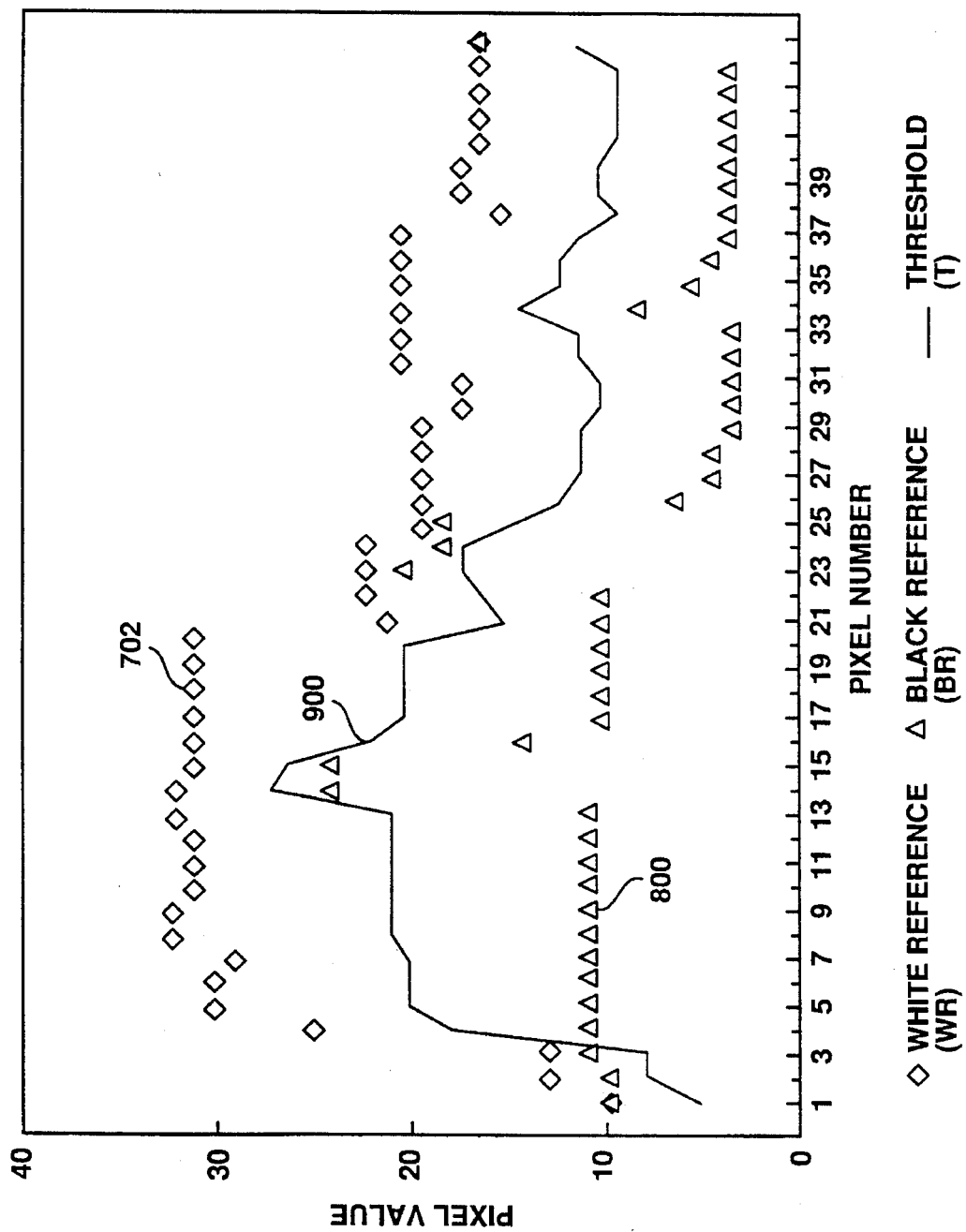
Figure 10:
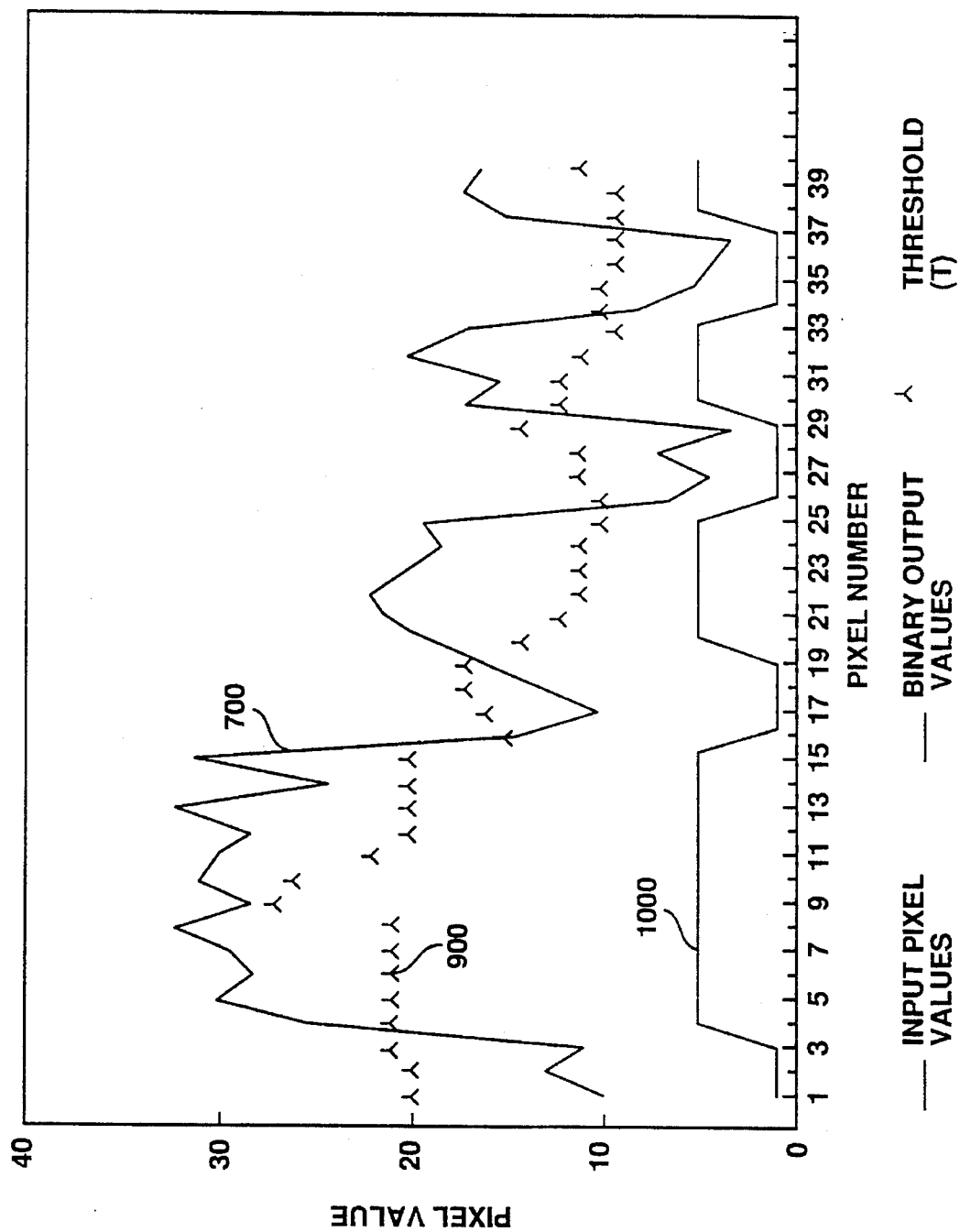

FIG. 9 presents plots of the white reference values 702 and black reference values 800 along with a plot of the threshold values 900 generated by threshold determinator 212. FIG. 10 presents plots of the input pixels 700 and the threshold values 900 along with a plot representing the binary output values 1000 generated by comparator 214. For purposes of graphical presentation only, a black output generated by comparator 214 is plotted in FIG. 10 as a "1," while a white output generated by comparator 214 is plotted as a "5."

In Table I, the threshold values used to threshold the input pixels are "delayed" by 5 pixels. For example, pixel 1 with a value of 10 is thresholded using a threshold value of 20 as presented in row 6 of Table I. This delay of 5 pixels results from FIFO 206 having a size of 5 pixels. When filter 200 is processing pixel 6, FIFO 206 transmits pixel 1 to comparator 214. When filter 200 is started, the first five thresholds generated are not used, because no data is transmitted from FIFO 206 until the sixth pixel is processed. When filter 200 reaches the end of a row, filter 200 may hold the last pixel for another five cycles to allow FIFO 206 to empty. Table I therefore presents 45 sets of data for the 40-pixel row.

For pixels 14, 15, 23, 24, and 25, the differences between the white and black reference values were less than the specified dynamic-range threshold C1 of 10. As such, the thresholds corresponding to those pixels were generated using Equation (2) rather than Equation (1).

Figure 1:
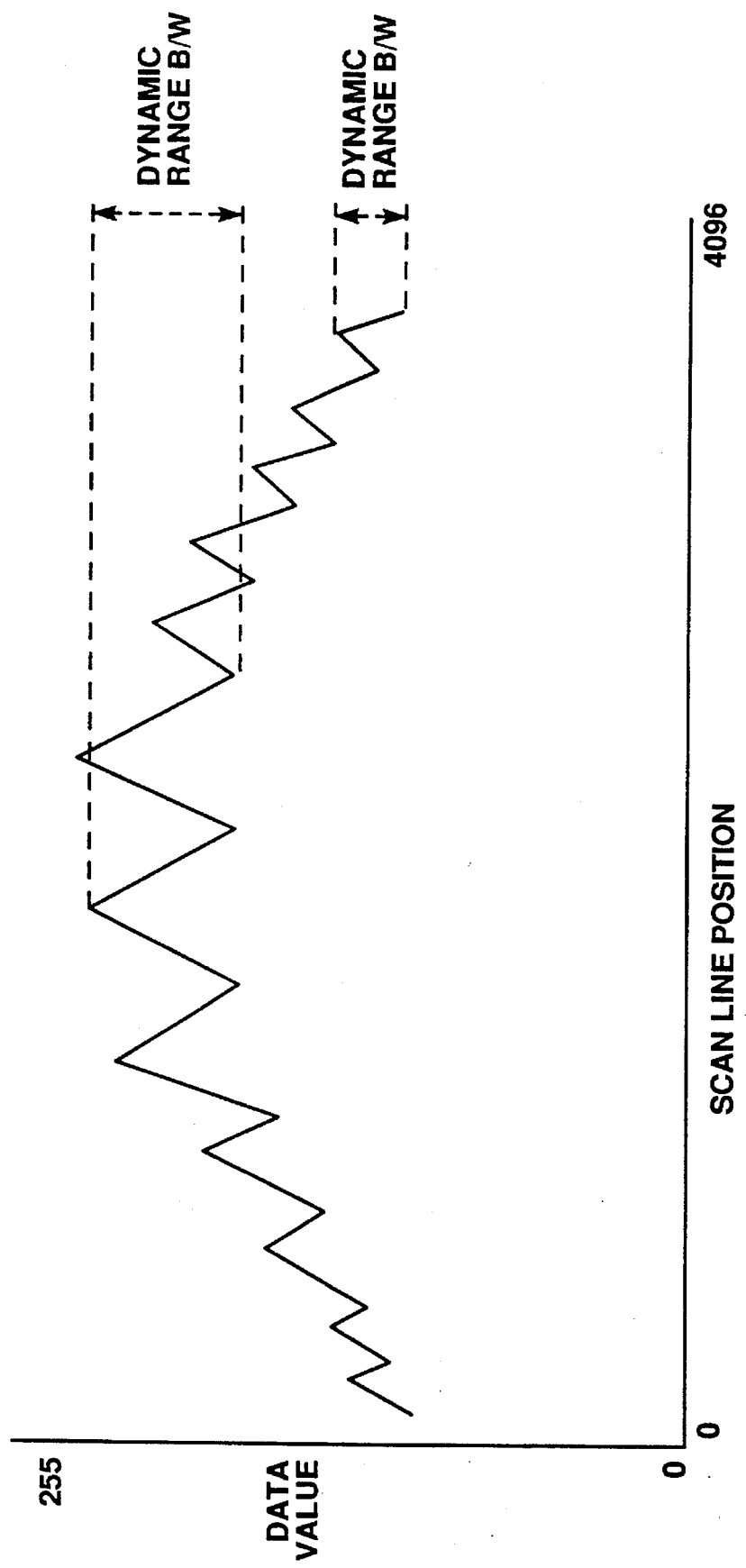
FIG. 1 is a graphical representation of one row of an eight-bit pixel image for which a fixed threshold value will not yield adequate results.

One application of filter 200 is to distinguish "bright" regions in an image from "dark" regions, where the offset and/or the dynamic range may vary across the image, as described earlier in this specification in conjunction with FIG. 1. The size of FIFO 206 and the parameters for the white and black reference aging functions control the region of the image over which the threshold value for a given pixel is determined. If the region is too large, the variation in offset will cause filter 200 to miss real transitions between bright and dark. Alternatively, if the region is too small, filter 200 will find spurious bright/dark transitions.

As shown in the example of Table I, filter 200 can be designed to take into account both trailing and leading pixels when determining the threshold value to use for the current pixel. The size of FIFO 206 dictates how many leading pixels are used. The aging function parameters can be set to dictate whether and how many trailing pixels are used. If the magnitude of the slope of the initial segment of the aging function is relatively small (i.e., more horizontal than vertical) and if it is long enough, then filter 200 will take into account trailing pixels. Otherwise, filter 200 takes into account only the current pixel and leading pixels.

Figure 11:
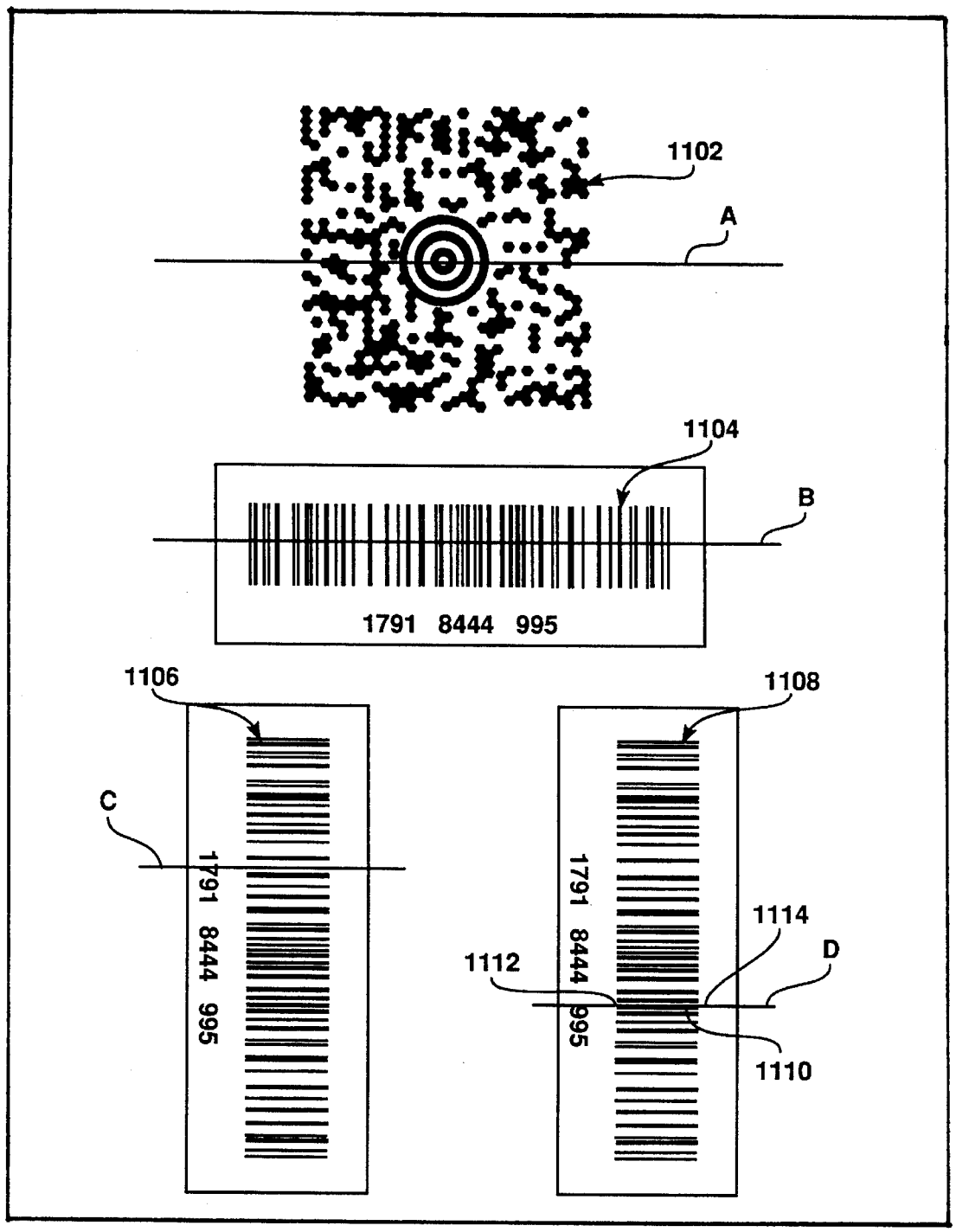
FIG. 11 is an image with one UPSCode® symbol and three barcode symbols with a pixel row indicated for each symbol.

To avoid spurious bright/dark transitions in an image comprising dark elements on a bright background, the size of FIFO 206 of filter 200 is preferably based on the maximum distance along a pixel row between bright pixels in the image. For example, FIG. 11 is an image with UPSCode® symbol 1102 and barcode symbols 1104, 1106, and 1108 on a bright background. UPSCode® symbols, a registered trademark of United Parcel Service of America, Inc., are defined in U.S. Pat. No. 4,874,936 (Chandler et al.) and U.S. Pat. No. 4,896,029 (Chandler et al.).

Also indicated in FIG. 11 are pixel rows A, B, C, and D, which cross symbols 1102, 1104, 1106, and 1108, respectively. Pixel row D coincides with horizontal bar 1110 of symbol 1108. The length of bar 1110 corresponds to the largest separation in FIG. 11 between bright pixels. The size of FIFO 206 is preferably selected to be equivalent to the distance between bright pixels 1112 and 1114 on either side of bar 1108 along pixel row D. The FIFO size may be determined by dividing that distance by the pixel size.

Figure 12:
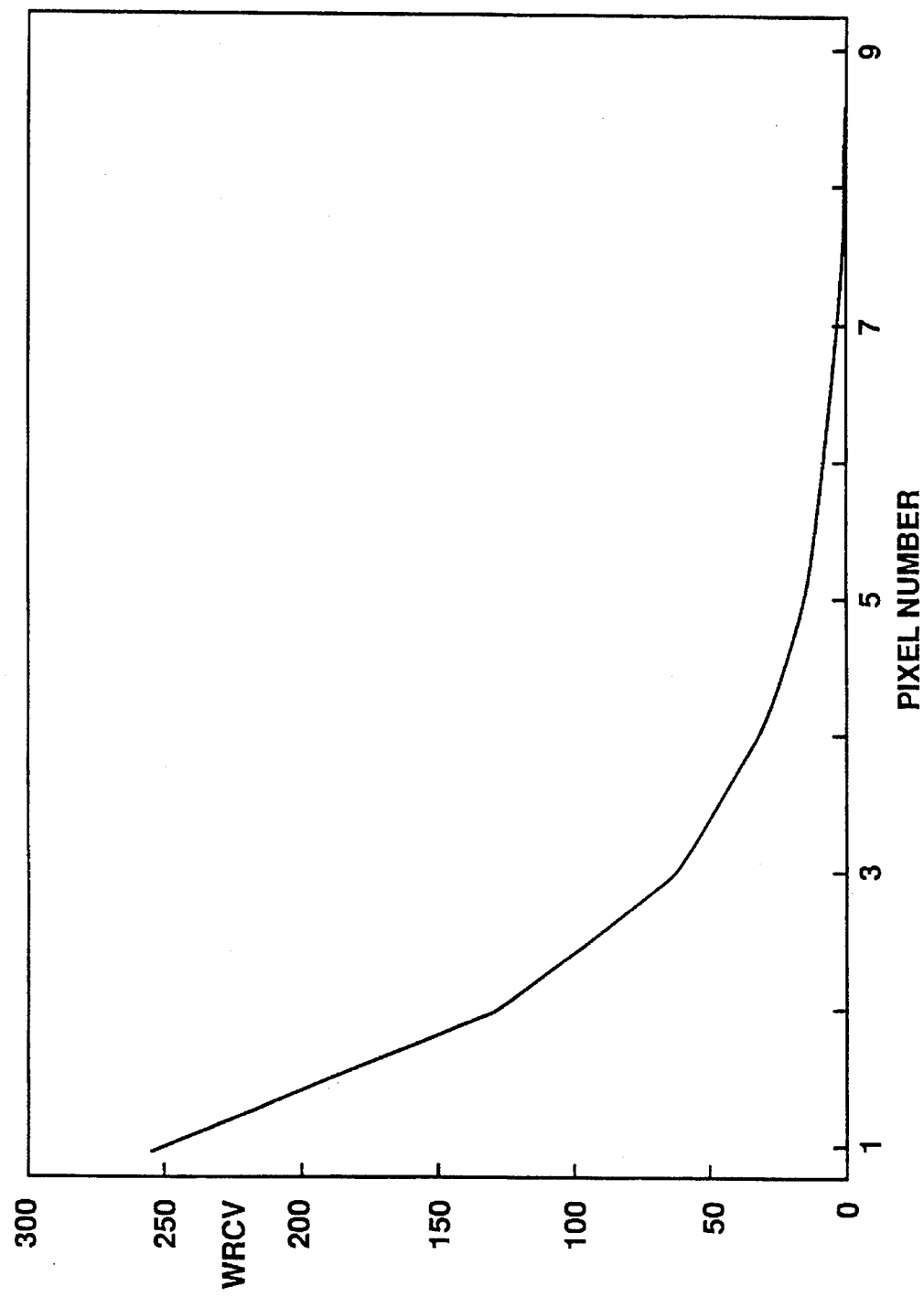
FIG. 12 is a graphical representation of a white reference aging function in which the white reference comparator value is divided by two.

Those skilled in the art will understand that the white and black reference aging functions are not limited to the piecewise linear functions defined earlier, but may be any programmable function. For example, the white reference aging function could divide the current white reference comparator value by two, as shown in FIG. 12.

The processing of threshold filters within the scope of the present invention are preferably designed to be driven by specified parameters. Those skilled in the art will understand that the values for these parameters may be selected empirically by processing sample images.

It will also be understood by those skilled in the art that threshold filters within the scope of the present invention may be employed to implement a two-dimensional threshold filter. Such filters require different FIFO configurations as well as different white and black reference detectors from those described in conjunction with FIG. 2.

It will be further understood that threshold filters within the scope of the present invention may generate multi-bit output images. For example, a two-bit output image may be generated using a threshold filter according to the present invention that generates three different threshold values for each input pixel.

It will also be understood that the threshold filter of the present invention may be implemented in hardware, software, or a combination of both. For example, the filter may be implemented in a field programmable gate array (FPGA) and a FIFO. Alternatively, the filter may be implemented using an application-specific integrated circuit (ASIC).

Those skilled in the art will understand that the threshold filter of the present invention may be used in systems that read barcode symbols. When processing images of barcode symbols, the threshold filter of the present invention generates thresholded images that may be further processed using the methods and apparatuses described in U.S. patent application No. 07/927,910, entitled "Method and Apparatus for Detecting and Decoding Bar Code Symbols," filed on Aug. 10, 1992, now U.S. Pat. No. 5,343,028 and commonly owned by the present assignee, the disclosure of which is incorporated herein by reference.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for generating a thresholded image signal from an input image signal having a plurality of pixel signals having multiple levels, the input image signal having been generated by imaging a physical scene with a camera, comprising the steps of:

(a) generating a first threshold signal in accordance with one or more aging functions, wherein at least one of said one or more aging functions is defined by a non-linear function;

(b) transforming a first input pixel signal of said input image signal into a first thresholded pixel signal by thresholding said first input pixel signal according to said first threshold signal;

(c) generating a second threshold signal in accordance with said one or more aging functions;

(d) transforming a second input pixel signal of said input image signal into a second thresholded pixel signal by thresholding said second input pixel signal according to said second threshold signal; and (e) generating said thresholded image signal in accordance with said first and second thresholded pixel signals, wherein;

said first input pixel signal and said second input pixel signal are from a single row of said input image signal; and said first and second threshold signals are generated, said first and second input pixel signals are transformed, and said thresholded image signal is generated all in pipeline fashion as the single row of said input image signal is generated by a video camera without buffering all of the input pixels signals of the single row at one time.

2. The method of claim 1, wherein said thresholded image signal is generated in real time in pipeline fashion as each row of said input image signal is generated by a line-scan video camera.

3. The method of claim 1, wherein step (a) comprises the steps of:

(1) generating a white reference signal in accordance with said one or more aging functions;

(2) generating a black reference signal in accordance with said one or more aging functions; and (3) generating said first threshold signal in accordance with said white and black reference signals.

4. The method of claim 3, wherein step (a)(3) comprises the step of generating said first threshold signal according to:

$$T=BR+C2*(WR-BR),$$

wherein T is said first threshold signal, WR is said white reference signal, BR is said black reference signal, and C2 is a specified signal.

5. The method of claim 3, wherein step (a)(3) comprises the step of generating said first threshold signal according to:

$$T=WR-C3,$$

wherein T is said first threshold signal, WR is said white reference signal, and C3 is a specified signal.

6. The method of claim 3, wherein step (a)(3) comprises the step of generating said first threshold signal according to:

$$T=BR+C3,$$

wherein T is said first threshold signal, BR is said black reference signal, and C3 is a specified signal.

7. The method of claim 3, wherein step (a)(1) comprises the step of generating said white reference signal in accordance with said one or more aging functions and said pixel signals of said input image signal.

8. The method of claim 1, wherein said one or more aging functions comprises a white reference aging function and a black reference aging function.

9. The method of claim 8, wherein said white reference aging function is defined by a sequence of two or more linear segments having different slopes.

10. An apparatus for generating a thresholded image signal from an input image signal having a plurality of pixel signals having multiple levels, the input image signal having been generated by imaging a physical scene with a camera, comprising:

(a) means for generating a first threshold signal and a second threshold signal in accordance with one or more aging functions, wherein at least one of said one or more aging functions is defined by a non-linear function;

(b) means for transforming a first pixel signal of said input image signal into a first thresholded pixel signal by thresholding said first input pixel signal according to said first threshold signal and for generating a second pixel signal of said input image signal into a second thresholded pixel signal by thresholding said second input pixel signal according to said second threshold signal; and (c) means for generating said thresholded image signal in accordance with said first and second thresholded pixel signals, wherein:

said first input pixel signal and said second input pixel signal are from a single row of said input image signal; and said first and second threshold signals are generated, said first and second input pixel signals are transformed, and said thresholded image signal is generated all in pipeline fashion as the single row of said input image signal is generated by a video camera without buffering all of the input pixels signals of the single row at one time.

11. The apparatus of claim 10, wherein said thresholded image signal is generated in real time in pipeline fashion as each row of said input image signal is generated by a line-scan video camera.

12. The apparatus of claim 10, wherein said means of element (a) comprises:

(1) means for generating a white reference signal in accordance with said one or more aging functions;

(2) means for generating a black reference signal in accordance with said one or more aging functions; and (3) means for generating said first threshold signal in accordance with said white and black reference signals.

13. The apparatus of claim 12, wherein said means of element (a) (3) generates said first threshold signal according to:

$$T=BR+C2*(WR-BR),$$

wherein T is said first threshold signal, WR is said white reference signal, BR is said black reference signal, and C2 is a specified signal.

14. The apparatus of claim 12, wherein said means of element (a) (3) generates said first threshold signal according to:

$$T=WR-C3,$$

wherein T is said first threshold signal, WR is said white reference signal, and C3 is a specified signal.

15. The apparatus of claim 12, wherein said means of element (a) (3) generates said first threshold signal according to:

$$T=BR+C3,$$

wherein T is said first threshold signal, BR is said black reference signal, and C3 is a specified signal.

16. The apparatus of claim 12, wherein said means of element (a)(1) generates said white reference signal in accordance with said one or more aging functions and said pixel signals of said input image signal.

17. The apparatus of claim 10, wherein said one or more aging functions comprises a white reference aging function and a black reference aging function.

18. The apparatus of claim 17, wherein said white reference aging function is defined by a sequence of two or more linear segments having different slopes.

19. An apparatus for generating a thresholded image signal from an input image signal having a plurality of input pixel signals having multiple levels, the input image signal having been generated by imaging a physical scene with a camera, comprising:

(a) means for generating one or more white reference signals and one or more white reference comparator signals in accordance with said plurality of input pixel signals;

(b) means for generating one or more black reference signals and one or more black reference comparator signals in accordance with said plurality of input pixel signals;

(c) means for applying a white reference aging function to said white reference comparator signals;

(d) means for applying a black reference aging function to said black reference comparator signals, wherein at least one of said white aging function and said black aging function is defined by a non-linear function;

(e) means for determining one or more threshold signals in accordance with said white and black reference signals;

(f) means for thresholding said plurality of input pixel signals in accordance with said threshold signals to generate a plurality of thresholded pixel signals; and (g) means for generating said thresholded image signal in accordance with said plurality of thresholded pixel signals, wherein;

said plurality of input pixel signals are from a single row of said input image signal; and said white and black reference signals are generated, said white and black reference comparator signals are generated, said white and black reference aging functions are applied, respectively, to said white and black reference comparator signals, said threshold signals are determined, said thresholded pixel signals are generated, and said thresholded image signal is generated all in pipeline fashion as the single row of said input image signal is generated by a video camera without buffering all of the input pixels signals of the single row at one time.

20. The apparatus of claim 19, further comprising storage means for storing said plurality of input pixel signals, wherein said storage means receives a first pixel signal of said plurality of input pixel signals and transmits a second pixel signal of said plurality of input pixel signals, and said thresholding means thresholds said second pixel signal in accordance with a threshold signal determined in accordance with said first pixel signal.

21. The apparatus of claim 19, wherein said means of element (c) generates a next white reference comparator signal by applying said white reference aging function to a previous white reference comparator signal and said means of element (a) determines a next white reference signal in accordance with said next white reference comparator signal.

22. The apparatus of claim 19, wherein said white reference aging function is defined by a sequence of contiguous linear segments.

23. The apparatus of claim 19, wherein said thresholded image signal is generated in real time in pipeline fashion as each row of said input image signal is generated by a line-scan video camera.

24. A method of generating a thresholded image signal from an input image signal having a plurality of input pixel signals having multiple levels, the input image signal having been generated by imaging a physical scene with a earners, comprising:

(a) receiving a first pixel signal of said plurality of input pixel signals;

(b) receiving a second pixel signal of said plurality of input pixel signals;

(c) generating a white reference signal and a first white reference comparator signal in accordance with said second pixel signal;

(d) generating a black reference signal and a first black reference comparator signal in accordance with said second pixel signal;

(e) applying a white reference aging function to said first white reference comparator signal to generate a second white reference comparator signal;

(f) applying a black reference aging function to said first black reference comparator signal to generate a second black reference comparator signal, wherein at least one of said white aging function and said black aging function is defined by a non-linear function;

(g) generating a threshold signal in accordance with said white and black reference signals;

(h) thresholding said first pixel signal in accordance with said threshold signal to generate a first thresholded pixel signal; and (i) generating said thresholded image signal in accordance with said first thresholded pixel signal, wherein;

said first and second pixel signals are from a single row of said input image signal; and said white and black reference signals are generated, said first white and black reference comparator signals are generated, said second white and black reference comparator signals are generated, said threshold signal is generated, said first thresholded pixel signal is generated, and said thresholded image signal is generated all in pipeline fashion as the single row of said input image signal is generated by a video camera without buffering all of the input pixels signals of the single row at one time.

25. The method of claim 24, comprising the further steps of:

(j) receiving a third pixel signal of said plurality of input pixel signals;

(k) comparing said third pixel signal to said second white reference comparator signal; and (l) generating a new white reference signal in accordance with said comparison of step (k).

26. The method of claim 24, comprising the further steps of:

(j) receiving a third pixel signal of said plurality of input pixel signals;

(k) applying said white reference aging function to said second white reference comparator signal to generate a third white reference comparator signal;

(l) comparing said third pixel signal to said third white reference comparator signal; and (m) generating a new white reference signal in accordance with said comparison of step (l).

27. The method of claim 24, wherein said white reference aging function is defined by a sequence of two or more linear segments having different slopes.

28. The method of claim 24, wherein said thresholded image signal is generated in real time in pipeline fashion as each row of said input image signal is generated by a line-scan video camera.

* * * * *

UNITED STATES PATENT AND TRADEMARK OFFICE
CERTIFICATE OF CORRECTION

PATENT NO. : 5,553,167
DATED : September 3, 1996
INVENTOR(S) : John H. Dowling

It is certified that error appears in the above-identified patent and that said Letters Patent is hereby corrected as shown below:

Column 5, line 8:
Delete "Li,", and insert therefor --Li.--.

Column 13, line 62:
Delete "earners", and insert therefor --camera--.

Signed and Sealed this

Fifteenth Day of April, 1997

Attest:

BRUCE LEHMAN

Attesting Officer          Commissioner of Patents and Trademarks